United States Patent Office

3,687,844
Patented Aug. 29, 1972

3,687,844
PURIFICATION PROCESS
Karl Grob and Josef Oertter, Frankfurt am Main, and Paul Wiesner, Oberursel, Germany, assignors to Metallgesellschaft AG, Frankfurt am Main, Reuterweg, Germany
No Drawing. Filed Nov. 25, 1970, Ser. No. 92,934
Claims priority, application Germany, Dec. 24, 1969, P 19 64 989.9
Int. Cl. B01d *15/00;* B01j *9/00*
U.S. Cl. 210—23                                    6 Claims

ABSTRACT OF THE DISCLOSURE

The aqueous refining phase from a solvent extraction step of a mineral wet processing process is purified of extraction agent residues by passing the aqueous refining phase through a granulated layer of hydrophobic material having acid surface action into a sedimentation chamber and withdrawing the thus purified refining phase from below.

BACKGROUND

This invention relates to a process for the extraction of metal ions from their aqueous solutions by means of solvent extraction.

With many processes for the wet processing of minerals, for example ore leaching, acid solutions of metal salts are obtained as primary product. From these acid salt solutions single or several kinds of the dissolved ions are isolated by solvent extraction and enriched. The solvents used in the solvent extraction are mixtures of organic liquids which cannot be mixed with water. These solvents can contain components with ion-exchanging properties. The extraction is carried out by means of the known multi-step counter-current extractors with a mixer and a separator in each step (mixer-settler-type). The aqueous solution to be worked up and the liquid extraction agent are let in counter-current through the extractor and mixed and separated again in each step. From the extractor, there are removed the non-aqueous extraction phase containing the extracted substances and an aqueous refined phase poor in these substances.

Practical applications of this wet processing are for example the extraction of uranium ions or thorium ions from aqueous solutions of their nitrates with liquid extraction agents. These extraction agents are liquids, which are not miscible or are difficulty miscible with water, and which contain phosphoric acid esters, aliphatic tertiary bases, ketones or the like, often in mixture with hydrocarbons, for example with kerosenes and higher alcohols.

The aqueous acid extracts obtained with the wet processing of ores are, as is known, liquids clouded by very finely divided solids or kept in colloidal solution, which liquids cannot be purified by filtration but only clarified by sedimentation. The impurities remaining in the clarified liquid can, in the subsequent extraction considerably hinder or retard the separation of the phase-mixture in the separators, at least in the first step. From the German Pat. No. 1,272,272 it is known that such emulsion formations can be suppressed or at least considerably limited by an addition of small quantities of powdery materials containing free carbon such as vegetable carbon, activated carbon, graphite, cokes or coal. These added substances will be lost with the extract preparation or with the refined product.

When, in the wet processing of ores by means of leaching and the like, use is made of the subsequent step of the solvent extraction, then the degree of purity of the refining phase derived from the extractor (as regards the extraction agent residues remaining therein) is a critical point of the process, even when it is possible to prevent the emulsion formation in the extraction steps. The refined phase coming from the extractor is a thin acid aqueous solution, rich in salt, which cannot be evacuated as waste water because of its composition and because of the large quantities produced. Because of its still considerable acid content, the refining phase is recycled in the solution for reasons of economy and to avoiding working up a waste water as decomposition agent. For this repeated utilisation it is, however, a first condition that the refining phase only contains traces of extraction agent components, because these extraction agent residues can be of great hindrance in wet metallurgical processes. Furthermore, large quantities of the refining phase are carried along with the quantities of extraction agent which, even with low water solubility, may represent a considerable economical loss.

The purpose of the invention is to remove, as much as possible from the aqueous refining phase, a basic extraction agent carried along in combination with the solvent extraction with the wet processing of ore, so that the extraction agent droplets remaining in a fine dispersion in the refining phase are brought together for separation as coherent phase.

In the mineral oil technique use is made of arrangements in which droplets of water or of salt solutions dispersed in mineral oil are separated. Such arrangements are known as coalescers. These coalescers may consist of layers of granulated material such as sand or glass fragments or of bundles of wood wool, metal shavings or of glass fibers or mineral wool. The water-containing oil is led through a coalescer filled with the said materials to a sedimentation space in which the water particles coalesced to sinkable drops separate downwards. For the de-oiling of water waters use is made of similar arrangements with fillings of lava gravel, pumice, diatomite or the like. (U.S. Pat. 2,224,624: J. H. Perry, Chemical Engineers Handbook (1963) 2119).

Tests with such coalescers with fillings of the said known materials for purifying the aqueous acid refining phase were unsuccessful. None of the known filling materials brought the residual small quantities of extraction agent to separation.

SUMMARY

It has now been found that the surface structure of a coalescer is decisive for the suitability of a filling material and that this surface must have a fissured sharp edged structure and furthermore must be hydrophobe and have a certain acidity. A material having these properties, cokes, resulting from the decomposition distillation of coal, tar, pitch or mineral oil residues, has proved suitable in several cases in which an oily dispersion phase is to be separated from an aqueous continuity phase.

The object of the invention is a process for the purification of the aqueous refining phase from a solvent extraction in combination with the wet processing of minerals for the separating of extraction agent residues carried along.

The process according to the invention is characterised in that the clarified refining phase is led through a granulated layer of hydrophobic materials with acid surface action into a sedimentation container from which the purified refining phase is withdrawn from below.

DESCRIPTION

The coke particles preferably have a granulation diameter of about 2 to 20 mm. They are arranged in a shaftlife container as short and tall columns for comparison. The refining phase to be purified is passed upward through the columns and the surface load is 10 to 30 cubic meters of refining phase per square meter cross-section of flow per hour.

The coke particles can be obtained, for example by screening from the sifted crushed oven coke of a metallurgical coking plant. Such coking gives the coke particles on acid surface action. The coke particles can, however, also be produced by briquetting or pelletising of fine coke or fine coal with bituminous binding agents such as tar, pitch or the like and coking of the briquettes or pellets. The coking temperature should not be much more than 800° C. so as to avoid a graphitisation of the particle surfaces which would destroy the acid surface function resulting from the coking. Suitable initial substances for the production of such coke particles are coal, lignite, peat or coke obtained therefrom, earth oil bitumen, petroleum coke and the like.

For filling the shaft-like container use is preferably made of particles of a small range of granulation so as to keep the flow resistance of the coke layer as small as possible. In such a coke layer, the direction of flow of the liquid is changed often and suddenly so that, more particularly with high velocities within the range or turbulent flow, there will be a good contact between the liquid and the coke particles. The weakly acid and hydrophobic surface with only a very small affinity to the acid aqueous solution, moistens itself with the droplets of the solvent dispersed in the liquid so that they agglomerate to large drops on the coke surface and can form a discretely coherent phase.

The refining phase flowing from the shaft-like container above the coke layer is led to a clarification container in which, for example by means of a baffle weir, a run-off zone is delimited, from which the liquid rising from the bottom of the container can be siphoned off.

The clarification container may be united with the shaft-like container into a single constructional unit, for example in such a way that an overflow trough surrounding the shaft at the upper end is sub-divided in a suitable manner and is provided with diversion means for the purified refining product and the separated solvent. Since the clarification container often has to serve as an intermediate store, for example when the ore leaching is carried out intermittently, use is made of clarification basins which may be at some distance from the shaft-like container of the coke layer. In these clarification basins there is in the intervals of time during which no purified refined material is withdrawn, a state of very small flow which considerably promotes the separation of enlarged drops of solvent.

The invention will be explained in more detail by reference to the following examples.

EXAMPLE 1

So as to be able to ascertain and compare the efficiency of different granulated materials for the purification of the acid solvent containing refined product from solutions of ore leaching, as test apparatus, a double-walled heatable glass tube with an inner diameter of 50 mm. and a length of 1000 mm. was placed vertically and filled with the granulated material to be tested up to a height of layer of 800 mm.

As liquid to be treated, in all tests served refined material, of a uranium extraction, still containing residues of the solvent, pre-purified in known manner in coalescers and separators. The solvent was a mixture of 93% by weight of kerosene, 2% by weight of isodecanol and 5% by weight of a tertiary amine, each with 8 C-atoms in the alkyl groups.

The degree of purity of the refined material treated according to the invention was ascertained by measuring the base content remaining therein.

This liquid to be treated was passed through the layer of granulated material with a velocity of 30 liters per hour which corresponds to a surface load of 5 m.$^3$ per m.$^2$ cross-section of flow per hour. The liquid treated was collected in high vessel and was left for about 10 minutes for clarification. Granular fillings of different granulation of gravel or ceramic material proved to be ineffective. The amine content of the liquid treated in this manner was unchanged as compared with the non-treated liquid.

Screened oven coke of a granulation filling of 10 to 15 mm. had an amine content of 35 p.p.m. in the non-treated liquid reduced to 3 p.p.m. in the treated liquid.

The comparison tests were carried out at a temperature of 35° C. With the coke filling a temperature increase to 50° C. resulted in an acceleration of the separation, which allowed an increase of the surface load to 12 m.$^3$/m.$^2$ per hour.

EXAMPLE 2

A large scale test with a coke layer of a height of 1 m. and a diameter of 1 m. was carried out with a surface load which varied between 20 and 30 m.$^3$/m.$^2$ per hour at a temperature of 35° C. in the liquid to be treated.

The coke particles had a granulation of between 5 and 10 mm. Here also, the amine content dropped from 35 p.p.m. in the non-treated solution to 3 p.p.m. in the treated solution.

What is claimed is:

1. Process for the purification of the aqueous refining phase from a solvent extraction step of a mineral wet processing process for separating solvent residues carried in said aqueous refining phase which comprises passing said aqueous refining phase through a layer of hydrophobic granular material having an acid surface action into a clarification zone wherein said solvent residues form a coherent separate solvent phase which rises to the top and is removed and the purified refining phase is withdrawn from below, said hydrophobic granular material being a coking product which is prepared by coking without after treatment a material selected from the group consisting of coal, lignite, peat, pitch, earth oil bitumen and mixtures of two or more of the foregoing.

2. Process of claim 1 wherein said coking is carried out at a temperature not more than 800° C.

3. Process of claim 1 wherein the granular material is metallurgical coke.

4. Process of claim 1 wherein the granular material is produced by briquetting or pelletising of finely granulated coal with a bituminous binding agent and coking of the briquettes or pellets at temperatures below 800° C.

5. Process of claim 1 wherein the granular material has a granulation of 2 to 20 mm.

6. Process of claim 1 wherein the refined product to be purified is passed through a layer of the granular material, the height of which is at least equal to its diameter, with a surface load of 10 to 30 cubic meters per square meter per hour.

References Cited
UNITED STATES PATENTS

| | | | |
|---|---|---|---|
| 1,987,870 | 1/1935 | Robinson | 252—322 |
| 2,336,482 | 12/1943 | Hatfield | 252—324 |
| 3,242,097 | 3/1966 | Crawford | 252—325 |
| 3,157,463 | 11/1964 | Burger | 252—324 X |
| 3,274,104 | 9/1966 | Hamilton | 210—39 |
| 2,008,145 | 7/1935 | Morrell | 210—39 X |
| 2,546,903 | 3/1951 | Morrell | 210—39 X |
| 2,809,938 | 10/1957 | Goren et al. | 210—39 UX |
| 3,424,676 | 1/1969 | Johnson et al. | 210—40 |
| 2,448,337 | 8/1948 | Wickenden | 210—36 X |
| 3,284,337 | 11/1966 | Stoneburner | 210—40 X |

REUBEN FRIEDMAN, Primary Examiner

T. G. WYSE, Assistant Examiner

U.S. Cl. X.R.

210—40, 83; 252—325